(12) United States Patent
Alvarez Dominguez et al.

(10) Patent No.: US 12,132,629 B2
(45) Date of Patent: Oct. 29, 2024

(54) TRAFFIC MONITORING IN A NETWORK NODE

(71) Applicant: Telefonaktiebolaget LM Ericsson (publ), Stockholm (SE)

(72) Inventors: Rodrigo Alvarez Dominguez, Madrid (ES); Raul Barreda Soto, Madrid (ES); Daniel Torres Gonzalez, Guadalajara (ES); Miguel Angel Muñoz De La Torre Alonso, Madrid (ES); Miguel Angel Puente Pestaña, Madrid (ES); Carlos Jimenez Cordon, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 312 days.

(21) Appl. No.: 17/629,945

(22) PCT Filed: Sep. 13, 2019

(86) PCT No.: PCT/EP2019/074509
§ 371 (c)(1),
(2) Date: Jan. 25, 2022

(87) PCT Pub. No.: WO2021/018406
PCT Pub. Date: Feb. 4, 2021

(65) Prior Publication Data
US 2022/0303201 A1 Sep. 22, 2022

(30) Foreign Application Priority Data
Jul. 26, 2019 (EP) ..................... 19382643

(51) Int. Cl.
*H04L 43/065* (2022.01)
*H04L 43/0823* (2022.01)
*H04L 45/00* (2022.01)

(52) U.S. Cl.
CPC .......... *H04L 43/0823* (2013.01); *H04L 45/38* (2013.01); *H04L 45/70* (2013.01)

(58) Field of Classification Search
None
See application file for complete search history.

(56) References Cited

U.S. PATENT DOCUMENTS

2013/0282766 A1 10/2013 Goyal et al.
2017/0171362 A1 6/2017 Bolotov et al.
(Continued)

FOREIGN PATENT DOCUMENTS

CN 108370352 A 8/2018
CN 109218278 A 1/2019

OTHER PUBLICATIONS

3GPP, "3GPP TS 29.244 V15.3.0", 3rd Generation Partnership Project; Technical Specification Group Core Network and Terminals; Interface between the Control Plane and the User Plane Nodes; Stage 3 (Release 15), Sep. 2018, 1-189.
(Continued)

*Primary Examiner* — Minh Trang T Nguyen
(74) *Attorney, Agent, or Firm* — Weisberg I.P. Law, P.A.

(57) ABSTRACT

Methods and apparatus are provided for traffic monitoring in a network. In an example aspect, a method of traffic monitoring in a first network node comprises receiving a packet, determining that the packet matches a plurality of packet detection rules, and sending an indication to a second network node that the packet matches a plurality of packet detection rules.

20 Claims, 5 Drawing Sheets

(56) References Cited

U.S. PATENT DOCUMENTS

2018/0234876 A1  8/2018  Jheng et al.
2018/0309724 A1  10/2018 Kfir et al.
2022/0124601 A1* 4/2022  Hu ...................... H04L 67/141

OTHER PUBLICATIONS

3GPP, "3rd Generation Partnership Project; Technical Specification Group Services and System Aspects; System Architecture for the 5G System; Stage 2 (Release 15)", 3GPP TS 23.501 V0.5.0, May 2017, pp. 1-145.
Huawei, et al., "Support of forwarding of broadcast and multicast packets", 3GPP TSG-SA2 Meeting #134, S2-1908593, Sapporo, Japan, Jun. 24-28, 2019, 1-8.
Huawei, "Update of the TS to prepare it for 5GC/N4", 3GPP TSG CT4 Meeting #80, C4-175385, Kochi, India, Oct. 23-27, 2017, 1-81.
Xu, Yang, et al., "High-Throughput and Memory-Efficient Multimatch Packet Classification Based on Distributed and Pipelined Hash Tables", IEEE/ACM Transactions on Networking, vol. 22, No. 3, Jun. 2014, 982-995.
Chinese Office Action and Search Report with English machine translation dated Feb. 29, 2024 for Patent Application No. 201980099085.4, consisting of 16 pages.
3GPP TSG CT4 Meeting #77 C4-172050; Title: Pseudo-CR on Packet Detection Rules' Precedence; Agenda Item: 7.1.5; Source: Nokia, Alcatel-Lucent Shanghai Bell; Spec: 3GPP TS 29.244 V1.0.0; Document for: Decision; Date and Location: Apr. 3-7, 2017, Spokane, US, consisting of 8 pages.

* cited by examiner

TRAFFIC MONITORING IN A NETWORK NODE

TECHNICAL FIELD

Examples of the present disclosure relate to traffic monitoring in a network node.

BACKGROUND

In the 3GPP standardization forum, a reference architecture for 5G wireless communications network is defined, for example in section 4.2.3 of 3GPP TS 23.501 V0.5.0 (2017-05), which is incorporated herein by reference. FIG. 1 shows an example of a 5G network architecture 100. The 5G network architecture 100 includes the following entities and interfaces.

Packet Flow Description Function (PFDF) 102: in the 5G architecture 100, this is included within a Network Exposure Function (NEF) 104, for example to reduce the number of network functions in 5G. The PFDF 102 handles Packet Flow Descriptions (PFDs) associated with application identifier(s) and transfers them to the Session Management Function (SMF) 106 via a NG GW interface. The SMF 106 transfers these PFDs towards the User Plane Function (UPF) 108 through a N4 interface and PFD Management Procedure to enable the UPF 108 to perform accurate application detection when the PFDs are managed by a 3rd party service provider.

A Policy and Charging Rules Function (PCF) 112 is a functional element that performs policy control decision and flow-based charging control. The PCF provides network control regarding the service data flow detection.

The Session Management Function (SMF) 106 performs NAS handling for SM, User Equipment (UE) IP address allocation and management, sending Quality of Service (QoS) and policy NG2 information to the AN via an Access and Mobility Management Function (AMF) 114, Idle/Active aware, Policy & Offline/Online Charging i/f termination, Policy enforcement control part, Lawful intercept (CP and interface to LI System), UP selection and termination of NG4 interface.

A User Plane Function (UPF) 108 (e.g. Policy Control Enforcement Function) encompasses service data flow detection, policy enforcement and flow-based charging functionalities. Anchor point for Intra-/Inter-RAT mobility (when applicable), External IP point of interconnect, Packet routing & forwarding, QoS handling for User plane, Packet inspection and PCC rule enforcement, Lawful intercept (UP collection), Roaming interface (UP), Traffic counting and reporting. Deep Packet Inspection (DPI) technology, embedded in the UPF 108, supports packet inspection and service classification, which may classify IP packets according to a configured tree of rules so that they are assigned to a service session. DPI technology offers two types of analysis. Firstly, shallow packet inspection extracts basic protocol information such as IP addresses (source, destination) and other low-level connection states. This information typically resides in the packet header itself and consequently reveals the principal communication intent. Secondly, Deep Packet Inspection (DPI) provides application awareness. This is achieved by analyzing the content in both the packet header and the payload over a series of packet transactions. There are several possible methods of analysis used to identify and classify applications and protocols that are grouped into signatures. One of them is heuristic signatures which is related to the behavioral analysis of the user traffic. A heuristic traffic analyzer makes a best guess classification, but identification accuracy is not guaranteed to be 100%. This limitation is inherent in the heuristic approach. This type of analysis that considers the behavioral analysis of the packets may consume considerable processing resources because more than one packet may be taken into account for the analysis.

In 3GPP TS 29.244, which is incorporated herein by reference, is defined an interface between the user plane and the control plane in a network. Once a session has been established between e.g. UPF 108 and SMF 106 they may exchange some information such as for example Packet Detection Rules (PDRs). According to this standard, on receipt of a user plane packet, the UPF shall perform a lookup of the provisioned PDRs and:

identify first the PFCP session to which the packet corresponds; and find the first PDR matching the incoming packet, among all the PDRs provisioned for this PFCP session, starting with the PDRs with the highest precedence and continuing then with PDRs in decreasing order of precedence. Only the highest precedence PDR matching the packet shall be selected, i.e. the UP function shall stop the PDRs lookup once a matching PDR is found.

In other words, at present in a Control and User Plane Separation (CUPS) architecture, the UPF classifies traffic according to the precedence parameter of the PDRs. It defines the relative precedence of a PDR among all the PDRs provisioned within an PFCP session, and matches a packet with the first matching PDR in order of preference of the PDRs.

DPI technology uses heuristic analyzers that detect and identify protocols used by UEs (e.g. applications within those UEs) based on for example binary signature patterns, metrics or connectivity patterns. The difficulty of correctly identifying this type of traffic means that the protocol identification accuracy cannot be guaranteed. The higher the percentage of encrypted packets, the lower the detection rate. Furthermore, the continuing increase in the number of connected applications and protocols in a typical UE device may increase the probability of incorrect protocol detection increases because of the new protocols and applications increment every year. For this reason, content providers (e.g. Over The Top, OTT, providers) have increased collaboration with operators for providing a good method for detecting their applications. For example, a content provider can send to the operator, for example using a T8 interface, the rules (e.g. PDRs) for matching the traffic that corresponds to that content provider.

SUMMARY

One aspect of the present disclosure provides a method of traffic monitoring in a first network node. The method comprises receiving a packet, and determining that the packet matches a plurality of packet detection rules. The method also comprises sending an indication to a second network node that the packet matches a plurality of packet detection rules.

A further aspect of the present disclosure provides a method of traffic monitoring in a second network node. The method comprises sending a plurality of packet detection rules to a first network node, and receiving an indication that a packet received at the first network node matches the plurality of packet detection rules.

Another aspect of the present disclosure provides a method of traffic monitoring. The method comprises receiving an indication that a packet received at a first network node matches a plurality of packet detection rules, and sending a modification for at least one of the packet detection rules to the first network node.

An additional aspect of the present disclosure provides apparatus for traffic monitoring in a first network node. The apparatus comprises a processor and a memory. The memory contains instructions executable by the processor such that the apparatus is operable to receive a packet, determine that the packet matches a plurality of packet detection rules, and send an indication to a second network node that the packet matches a plurality of packet detection rules.

A still further aspect of the present disclosure provides apparatus for traffic monitoring in a second network node. The apparatus comprises a processor and a memory. The memory contains instructions executable by the processor such that the apparatus is operable to send a plurality of packet detection rules to a first network node, and receive an indication that a packet received at the first network node matches the plurality of packet detection rules.

Another aspect of the present disclosure provides apparatus for traffic monitoring. The apparatus comprises a processor and a memory. The memory contains instructions executable by the processor such that the apparatus is operable to receive an indication that a packet received at a first network node matches a plurality of packet detection rules, and send a modification for at least one of the packet detection rules to the first network node.

A further aspect of the present disclosure provides apparatus for traffic monitoring in a first network node. The apparatus is configured to receive a packet, determine that the packet matches a plurality of packet detection rules, and send an indication to a second network node that the packet matches a plurality of packet detection rules.

A still further aspect of the present disclosure provides apparatus for traffic monitoring in a second network node. The apparatus is configured to send a plurality of packet detection rules to a first network node, and receive an indication that a packet received at the first network node matches the plurality of packet detection rules.

An additional aspect of the present disclosure provides apparatus for traffic monitoring. The apparatus is configured to receive an indication that a packet received at a first network node matches a plurality of packet detection rules, and send a modification for at least one of the packet detection rules to the first network node.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
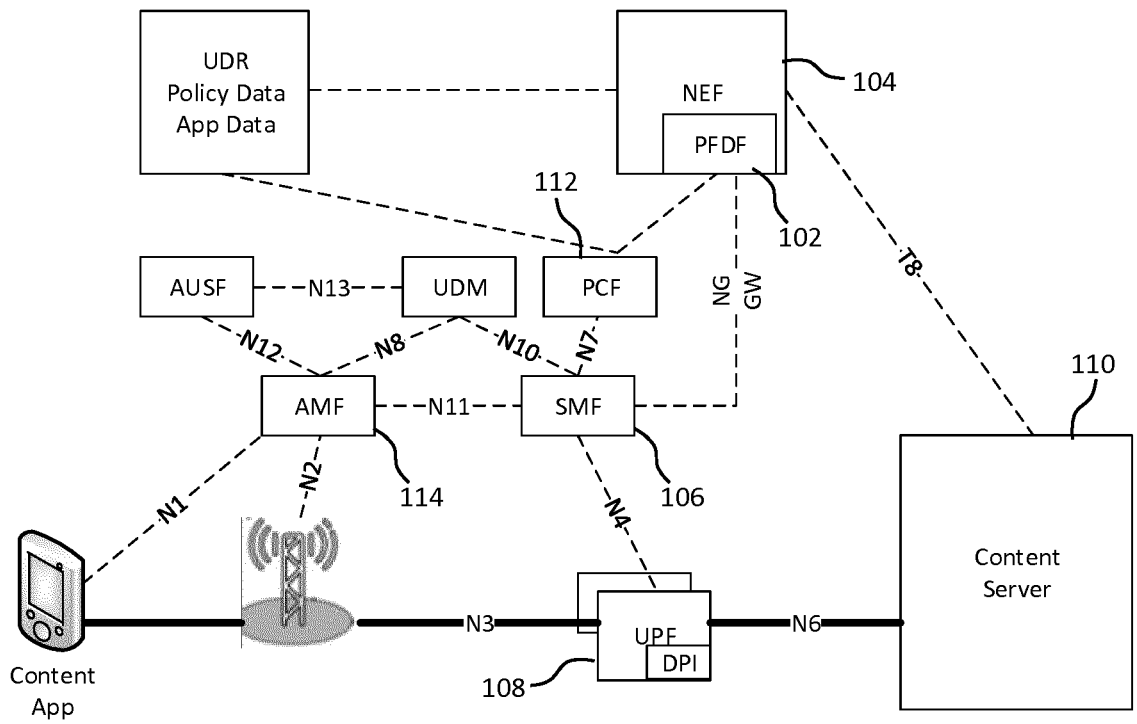
FIG. 1 shows an example of a 5G network architecture.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

According to the standard, e.g. 3GPP TS 29.244, PDRs must comply with the following rules:

No more than one PDR with the same match fields in the corresponding Packet Detection Information (PDI), i.e. with the same set of match fields and with the same values, for the same PFCP session.

There may be some overlapping rules for the same PFCP session. For example, two PDRs may differ by having one match field set to a specific value in one PDR and the same match field not included in the other PDR.

Different PFCP sessions should have at least one PDR which differs by at least one different match field.

With these principles defined by the standards, there may be situations where a packet could potentially match several PDRs. Therefore, the packet is matched to the PDR with the highest preference among the potentially matching PDRs. In these cases, where there is a conflict between PDRs and the packet is matched to the PDR with the higher precedence, it is difficult for an operator to know if this is the correct behaviour, e.g. that the packet has been matched to the correct PDR (e.g. the most preferred PDR, regardless of precedence).

In some examples as describe herein, a packet may be matched in a first network node (e.g. UPF) to multiple PDRs, and this may be reported to a second network node (e.g. SMF). The SMF may take appropriate action, such as for example updating the PDRs in the UPF. This may be done in some examples by the SMF consulting a third network node (e.g. PCF).

Figure 2:
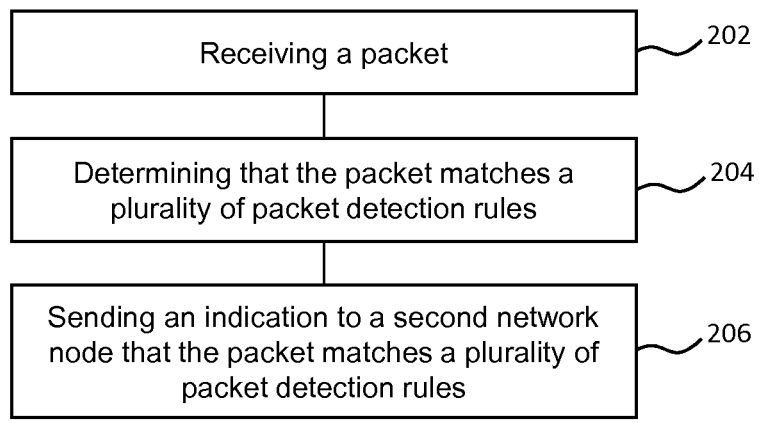
FIG. 2 is a flow chart of an example of a method of traffic monitoring in a first network node.

FIG. 2 is a flow chart of an example of a method 200 of traffic monitoring in a first network node, such as for example a UPF, Packet Gateway (PGW) or Packet Gateway- User Plane (PGW-U). The first network node (and other nodes as described herein) may be a node in a 5G network, though the node may be in another network such as an LTE network or a network with a mixture of standard types. The method comprises, in step 202, receiving a packet (e.g. an IP packet). In some examples, the packet may be received from the internet (e.g. downlink) or from a UE (e.g. uplink). Step 204 of the method 200 comprises determining that the packet matches a plurality of packet detection rules. That is, for example, once it is determined that the packet matches one PDR, the method 100 may continue to determine whether the packet matches any more PDRs. Determining that a packet matches a PDR may comprise for example determining that the packet matches respective Packet Detection Information (PDI) associated with the PDR. If the packet matches a plurality in PDRs, step 206 of the method 200 comprises sending an indication to a second network node (e.g. SMF or a Packet Gateway-Control Plane, PGW-C) that the packet matches a plurality of packet detection rules. Thus for example the first node may report to the second network node that there is a conflict in the PDRs configured in the first network node, as the packet matches multiple PDRs.

In some examples, the indication sent to the second network node may identify the PDRs (e.g. using a PDR ID), or the indication may contain the plurality of packet detection rules, such that for example the second network node (or any other network node) may identify the PDRs that are conflicting.

The method 100 may in some examples comprise, in response to determining that the packet matches the plurality of packet detection rules, sending the packet to the second network node. Thus the second network node (or any other network node) may identify the packet that has resulted in or identified the conflict in the PDRs.

The method 100 may in some examples comprise, after sending the indication to the second network node, receiving (e.g. from the second network node) a modification for one or more of the packet detection rules, and modifying the one or more of the packet detection rules according to the modification to produce modified packet detection rules. Therefore, for example, the PDRs may be modified such that the packet does not match all of the modified packet detection rules (although there may already have been other PDRs configured in the first network node that did not match the packet in step 104). In some cases, the packet may match only one of the modified PDRs. In some examples, the method 100 may also include performing a respective action associated with each of the modified packet detection rules that the packet matches. The respective action may be one or more of a forwarding action rule, FAR, buffering action rule, BAR, quality enforcement rule, QER, usage reporting rule, URR, and/or policy control and charging, PCC, rule. Thus, the action may be undertaken regarding the packet after the PDRs have been modified. In other examples, the action may be taken before the modification—e.g. action associated with the highest precedence matching PDR, or the actions associated with all of the matching PDRs. The modification may comprise, for example, one or more of addition of one or more new PDRs, deletion of one or more existing PDRs, and/or changes to one or more parameters of one or more existing PDRs.

In some examples, sending the indication to the second network node comprises sending an indication that a threshold number of packets or bytes have matched a plurality of packet detection rules.

In some examples, each of the packet detection rules is associated with a respective further indication that indicates whether a packet matching that packet detection rule is permitted to match one or more other packet detection rules. Thus for example some PDRs may be allowed to match to a packet that also matches one or more other PDRs. Therefore, in some examples, sending the indication to the second network node comprises sending an indication that the packet matches at least one packet detection rule associated with a further indication that the packet is not permitted to match any other packet detection rule. In these cases, for example, the indication is not sent to the second network node if all of the multiple matching PDRs are allowed to be multiple matching PDRs, i.e. the packet matches these multiple PDRs. In some examples, the further indication (that the PDR(s) may be allowed to match a packet that also matches other PDR(s)) may be received from the second network node. The packet detection rules may be additionally or alternatively received from the second network node.

Figure 3:
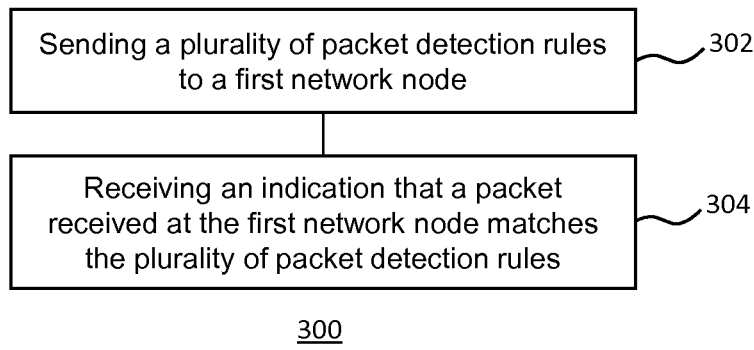
FIG. 3 is a flow chart of an example of a method of traffic monitoring in a second network node.

FIG. 3 is a flow chart of an example of a method 300 of traffic monitoring in a second network node, such as for example a Session Management Function, SMF, or a Packet Gateway-Control Plane, PGW-C. The method 300 comprises, in step 302, sending a plurality of packet detection rules to a first network node, such as for example a User Plane Function, UPF, Packet Gateway, PGW, or Packet Gateway-User Plane, PGW-U. In some examples, the first network node may implement the method 200 described above. Step 304 of the method 300 comprises receiving an indication (e.g. from the first network node) that a packet received at the first network node matches the plurality of packet detection rules. Therefore, for example, the second network node may determine that there is a conflict in the PDRs configured in the first network node.

In some examples, the indication identifies or contains the plurality of packet detection rules. Additionally or alternatively, the method 300 comprises receiving the packet from the first network node. Thus, for example, the second network node (or another network node, if this information is forwarded to another network node) may determine the PDRs that are conflicting.

The method 300 may in some examples comprise sending the indication to a third network node, such as for example a PCF, receiving a modification for one or more of the packet detection rules (e.g. from the third network node), and sending the modification to the first network node. Thus for example the PDRs configured in the first network node may be modified such that the packet matches fewer (e.g. only one) of the modified PDRs.

In some examples, each of the packet detection rules is associated with a respective further indication that indicates whether a packet matching that packet detection rule is permitted to match one or more other packet detection rules. Thus, in some examples, receiving the indication comprises receiving an indication that the packet matches at least one packet detection rule associated with a further indication that the packet is not permitted to match any other packet detection rule. Thus the indication is only received if one or more of the conflicting PDRs are not permitted to be a multiple-matching PDR, that is, a PDR in a group that matches the packet.

In some examples, the second network node may send the packet detection rules to the first network node before receiving the indication.

Figure 4:
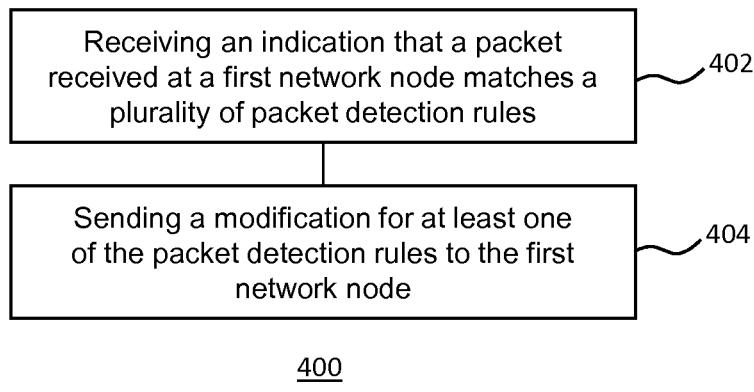
FIG. 4 is a flow chart of an example of a method of traffic monitoring.

FIG. 4 is a flow chart of an example of a method 400 of traffic monitoring. In some examples, the method 400 may be implemented in a PCF. The method 400 comprises, in step 402, receiving an indication that a packet received at a first network node matches a plurality of packet detection rules. The indication may be received from a second network node, e.g. a Session Management Function, SMF, or a Packet Gateway-Control Plane, PGW-C. Step 404 of the method 400 comprises sending a modification for at least one of the packet detection rules to the first network node. In some examples, the modification is sent via the second network node. The first network node may in some examples comprise a UPF, PGW or PGW-U. In some examples, the first network node may perform the method 200 described above, and/or the second network node may perform the method 300 described above.

Figure 5:
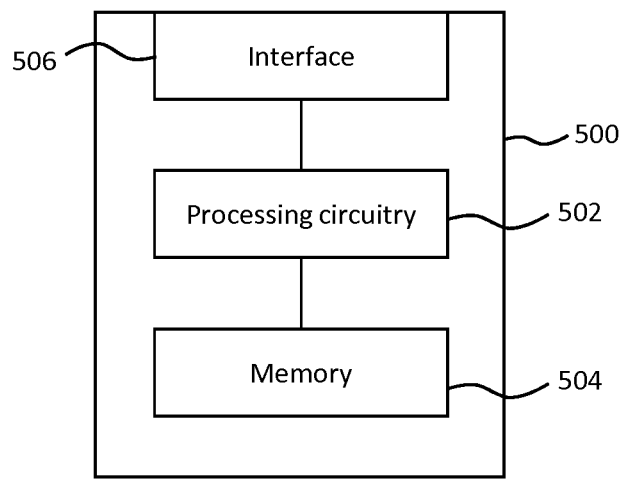
FIG. 5 is a schematic of an example of apparatus for traffic monitoring in a first network node.

FIG. 5 is a schematic of an example of apparatus 500 for traffic monitoring in a first network node. The apparatus 500 comprises processing circuitry 502 (e.g. one or more processors) and a memory 504 in communication with the processing circuitry 502. The memory 504 contains instructions executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable to receive a packet, determine that the packet matches a plurality of packet detection rules, and send an indication to a second network node that the packet matches a plurality of packet detection rules. In some examples, the memory 504 contains instructions executable by the processing circuitry 502 such that the apparatus 500 is operable to carry out the method 200 described above.

Figure 6:
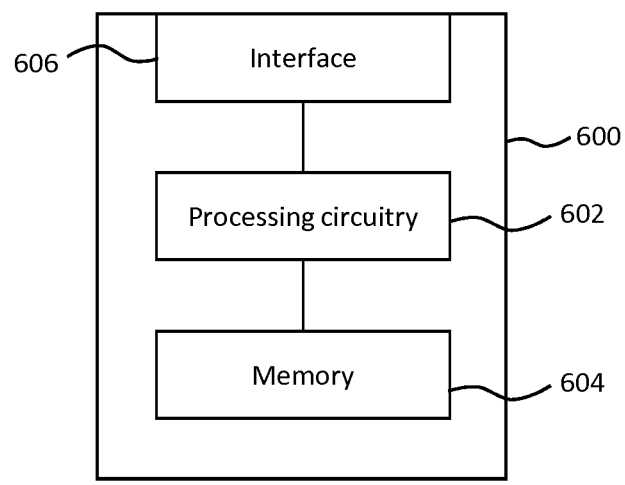
FIG. 6 is a schematic of an example of apparatus for traffic monitoring in a second network node.

FIG. 6 is a schematic of an example of apparatus 600 for traffic monitoring in a second network node. The apparatus 600 comprises processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable to send a plurality of packet detection rules to a first network node, and receive an indication that a packet received at the first network node matches the plurality of packet detection rules. In some examples, the memory 604 contains instructions executable by the processing circuitry 602 such that the apparatus 600 is operable to carry out the method 300 described above.

Figure 7:
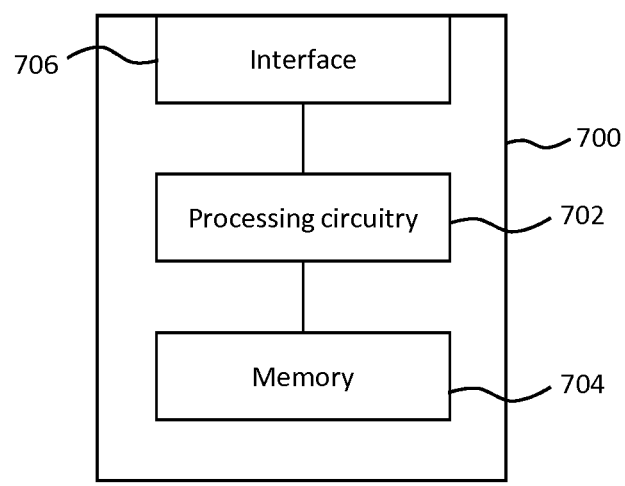
FIG. 7 is a schematic of an example of apparatus for traffic monitoring.

FIG. 7 is a schematic of an example of apparatus 700 for traffic monitoring (e.g. in a third network node such as a PCF). The apparatus 700 comprises processing circuitry 702 (e.g. one or more processors) and a memory 704 in communication with the processing circuitry 702. The memory 704 contains instructions executable by the processing circuitry 702. The apparatus 700 also comprises an interface 706 in communication with the processing circuitry 702. Although the interface 706, processing circuitry 702 and memory 704 are shown connected in series, these may alternatively be interconnected in any other way, for example via a bus.

In one embodiment, the memory 704 contains instructions executable by the processing circuitry 702 such that the apparatus 700 is operable to receive an indication that a packet received at a first network node matches a plurality of packet detection rules, and send a modification for at least one of the packet detection rules to the first network node.

Additional specific example embodiments will now be described.

Embodiments of this disclosure may be based on a scenario composed by a UE properly connected to a mobile network, in which there will be a node (a UPF) with deep packet inspection and service classification functionality, and an SMF sending PDR rules to the UPF.

UPF: User plane function with deep packet inspection and service classification requires updated rules from PFDF to classify the traffic from UE properly and apply, for instance, desired QoS or charging.

SMF: Session Management Function. Responsible for selecting the corresponding UPF for a PDU session and responsible for controlling UPF capabilities such as for example traffic detection, traffic reporting, QoS enforcements and/or traffic routing.

UE: User equipment.

PCF: Policy and Charging Rules Function. This is a functional element that performs policy control decision making and flow-based charging control. The PCF provides network control regarding the service data flow detection.

Figure 8:
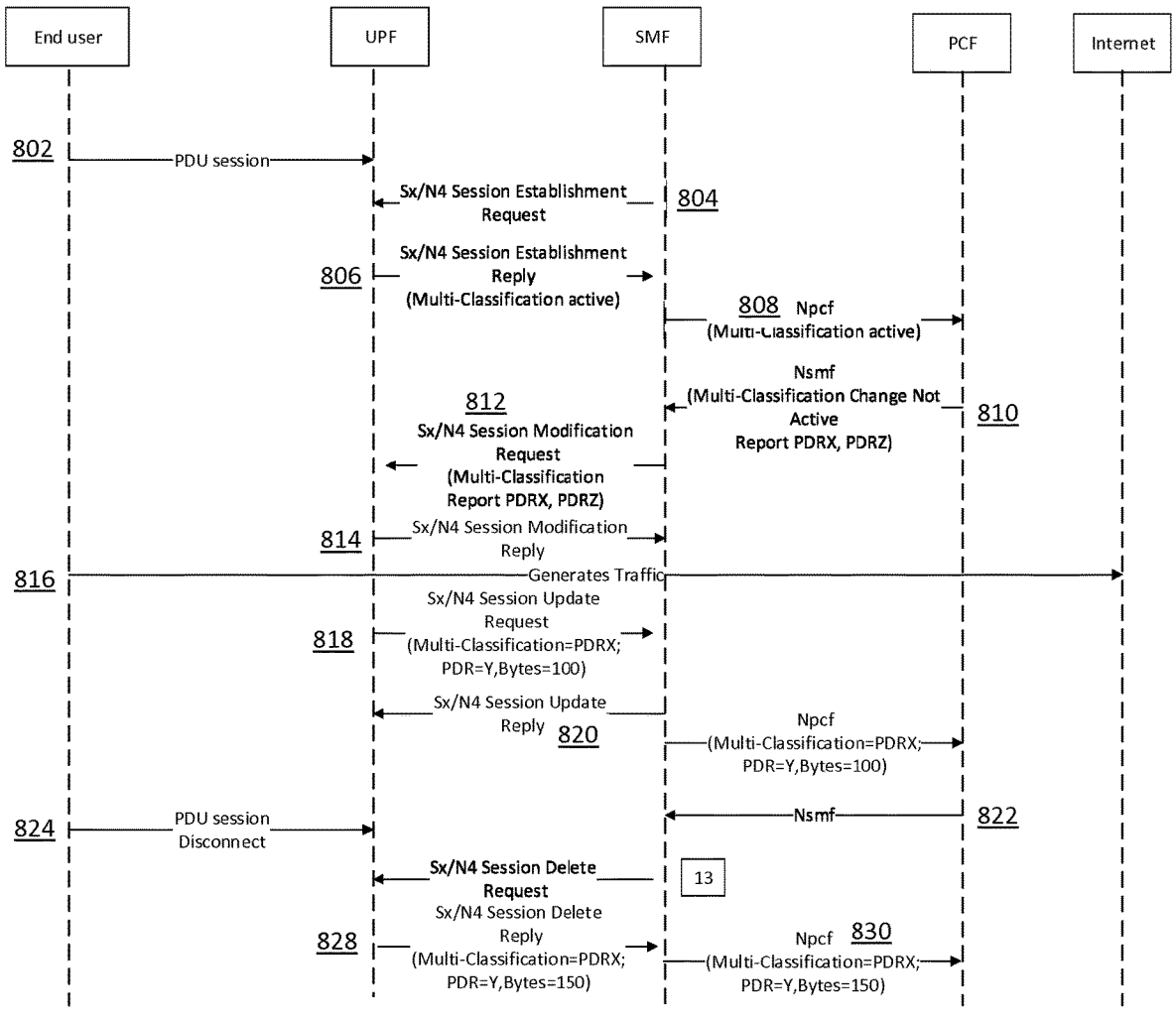
FIG. 8 shows an example of communications between network entities.

FIG. 8 shows an example of communications 800 between network entities, for example in embodiments where PCF does not support multi-classification in real time (i.e. the PCF does not support cases where a packet matches multiple PDRs), for example when establishing and/or performing traffic monitoring. The communications include the following (which may also be the steps of a method).

Step 802: End user (e.g. UE) establishes a PDU Session

Step 804: SMF creates a PFCP session towards UPF. It sends the PDRs for the end user with information about how to classify the traffic.

Step 806: UPF indicates to SMF that it can provide multi-classification.

Step 808: SMF indicates to PCF that the UPF can provide multi-classification information.

Step 810: PCF indicates that is not able to process the multi-classification information in real time. So, it cannot provide modifications. It can optionally indicate which PDRs they want to track for not having multi-classification (that is, for example, which PDR(s) are to be associated with an indication that they cannot be matched with a packet that also matches other PDRs).

Step 812: SMF indicates to UPF which PDRs cannot have multi-classification. In this example, PDR X and PDR Z.

Step 814: UPF acknowledges the previous message. Then UPF checks all traffic.

Step 816: End user generates traffic.

Step 818: UPF reports the usage of each PDR. For those rules that are multi-classified in the PDRs defined in step 812, it may for example reports after reaching a certain threshold those PDRs with multi-match.

Step 820: SMF answers with a reply. SMF sends this information to PCF.

Step 822: PCF answers to SMF.

Step 824: End user disconnects of the session.

Step 826: SMF sends a delete request of the PFCP session.

Step 828: UPF sends the PDRs with the multi-classification in the same format as in step 818.

Step 830: SMF sends the information to PCF.

Figure 9:
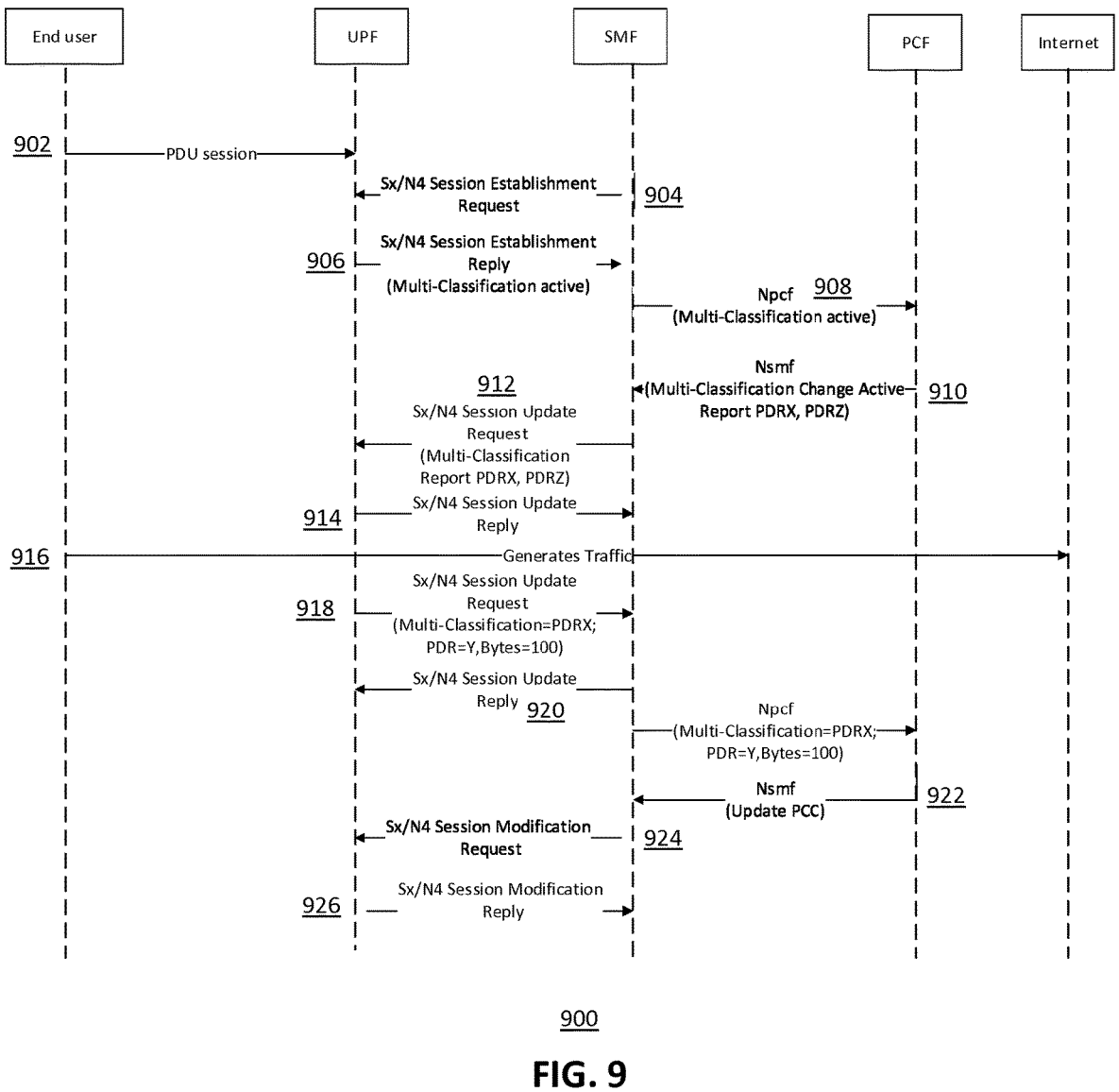
FIG. 9 shows another example of communications between network entities.

FIG. 9 shows another example of communications 900 between network entities, in a scenario where the PCF can modify the PDRs configured in the UPF, for example in real time), for example when establishing and/or performing traffic monitoring. The communications include the following (which may also be the steps of a method).

Step 902: End user establishes a PDU Session Step 904: SMF creates a PFCP session towards UPF. It sends the PDRs for the end user with the information about how to classify the traffic.

Step 906: UPF indicates to SMF that it can provide multi-classification.

Step 908: SMF indicates to PCF that the UPF can provide multi-classification information.

Step 910: PCF indicates that can process the multi-classification information in real time. So, it can provide modifications. It can send optionally which PDRs they want to track for not having multi-classification.

Step 912: SMF indicates to UPF which PDRs cannot have multi-classification. In this example, PDRX and PDR Z Step 914: UPF acknowledges the previous message. Then UPF checks all traffic.

Step 916: End user generates traffic.

Step 918: UPF reports the usage of each PDR. For those rules that are multi-classified in the PDRs defined in step 912, it may for example report after reaching a certain threshold those PDRs with multi-match.

Step 920: SMF answers with a reply. SMF sends this information to PCF.

Step 922: PCF answers to SMF. PCF processes the information about the PDR multi-classification. The PCF (e.g. according to the rating group of the PDR with multi-classification) can decide whether it should provide new rules (i.e. modifications to existing PDRs) to the SMF. PCF sends to SMF a modification of PDRs that indicates how PDR should be updated.

Step 924: SMF modifies the PDRs of the PFCP session according to the information received in the PCC rules of the PCF (i.e. according to the modification).

Step 926: UPF acknowledges the message and start classifying according to the modification.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of traffic monitoring in a first network node, the method comprising:
receiving multiple packet detection rules (PDRs) from a second network node;
receiving a packet;
detecting a PDR conflict, the packet matching more than one PDR among multiple PDRs comprising a PDR configuration at the first network node;
sending an indication of the PDR conflict to the second network node; and
after sending the indication of the PDR conflict:
receiving a modification for the PDR configuration, the modification comprising one or more of a PDR addition, a PDR deletion, or a PDR change; and
modifying the PDR configuration according to the modification, to obtain a modified PDR configuration.

2. The method of claim 1, further comprising at least one of:
including the matched PDRs or an indication thereof in the indication sent to the second network node; or
sending the packet to the second network node.

3. The method of claim 1, wherein the modification is received from the second network node.

4. The method of claim 1, further comprising, with respect to the modified PDR configuration:
determining that no PDR conflicts exist, based on the packet matching only a single PDR in the modified PDR configuration, and, in response, applying a respective action associated with that single matched PDR; or
determining that PDR conflicts still exist, based on the packet matching more than one PDR in the modified PDR configuration, and further determining that none of the multiple matched PDRs disallow PDR conflicts and, in response, applying respective actions associated with the multiple matched PDRs.

5. The method of claim 4, wherein each respective action applied is one or more of a forwarding action rule (FAR), a buffering action rule (BAR), a quality enforcement rule (QER), a usage reporting rule (URR), or a policy control and charging (PCC) rule.

6. The method of claim 1, further comprising determining that none of the matched PDRs disallow PDR conflicts and, in response, performing a respective action associated with each of the matched PDRs.

7. The method of claim 6, wherein each respective action is one or more of a forwarding action rule (FAR), a buffering action rule (BAR), a quality enforcement rule (QER), a usage reporting rule (URR), or a policy control and charging (PCC) rule.

8. The method of claim 1, wherein sending the indication of the PDR conflict to the second network node is conditioned on determining that a threshold number of PDR conflicts has occurred at the first network node, and wherein the indication sent to the second network node indicates that the threshold number of PDR conflicts has been reached.

9. The method of claim 1, wherein the second network node comprises a Session Management Function (SMF) or a Packet Gateway-Control Plane (PGW-C) in a wireless communications network, and wherein the first network node comprises a User Plane Function (UPF), a Packet Gateway (PGW), or a Packet Gateway-User Plane (PGW-U).

10. The method of claim 9, wherein the third network node comprises a Packet Control Function (PCF) in a wireless communications network, wherein the second network node comprises a Session Management Function (SMF) or a Packet Gateway-Control Plane (PGW-C) in the wireless communications network, and wherein the first network node comprises a User Plane Function (UPF), a Packet Gateway (PGW), or a Packet Gateway-User Plane (PGW-U) in the wireless communications network.

11. The method of claim 1, wherein the second network node comprises a Session Management Function (SMF) or a Packet Gateway-Control Plane (PGW-C) in a wireless communications network, and wherein the first network node comprises a User Plane Function (UPF), a Packet Gateway (PGW), or a Packet Gateway-User Plane (PGW-U).

12. A method of traffic monitoring in a second network node, the method comprising:
sending multiple packet detection rules (PDRs) to a first network node by the second node before receiving an indication of a PDR conflict at the first network node, the multiple PDRs comprising a PDR configuration for the first network node;
receiving the indication of the PDR conflict at the first network node, a packet received at the first network node matching more than one PDR among the multiple PDRs; and
responsive to receiving the indication of the PDR conflict:
sending the indication to a third network node;
receiving, from the third network node, a modification for the PDR configuration, the modification being one or more of a PDR addition, a PDR deletion, or a PDR change; and
sending the modification to the first network node, to trigger the first network node to modify the PDR configuration to obtain a modified PDR configuration in which, compared to the PDR configuration before modification, at least one PDR is added, deleted, or changed.

13. A method of traffic monitoring, the method comprising:
receiving an indication of a packet data rule (PDR) conflict at a first network node from a second network node, a packet received at the first network node matched more than one PDR among multiple PDRs comprised in a PDR configuration at the first network node;
determining, in response to the indication of the PDR conflict, a modification for the PDR configuration, the modification comprising one or more of a PDR addition, a PDR deletion, or a PDR change; and
sending the modification to the first network node or to the second network node that is operative to send the modification to the first network node, to trigger the first network node to obtain a modified PDR configuration according to the modification.

14. The method of claim 13, wherein the modification resolves the PDR conflict.

15. The method of claim 13, wherein the second network node comprises a Session Management Function (SMF), or a Packet Gateway-Control Plane (PGW-C) in a wireless communications network, and wherein the first network node comprises a User Plane Function (UPF), Packet Gateway (PGW), or Packet Gateway-User Plane (PGW-U).

16. The method of claim 15, wherein the method is performed by a Packet Control Function (PCF) of the wireless communications network.

17. An apparatus for traffic monitoring in a first network node, the apparatus comprising a processor and a memory, the memory containing instructions executable by the processor such that the apparatus is configured to:
receive multiple packet detection rules (PDRs) from a second network node;
receive a packet;
detect a PDR conflict with respect to a packet received by the first network node, the PDR conflict being detected as the packet matching more than one packet data rule (PDR) among multiple PDRs comprising a PDR configuration at the first network node;
send an indication of the PDR conflict to the second network node; and
after the indication of the PDR conflict is sent:
receive a modification for the PDR configuration, the modification comprising one or more of a PDR addition, a PDR deletion, or a PDR change; and
modify the PDR configuration according to the modification, to obtain a modified PDR configuration.

18. The apparatus of claim 17, wherein the apparatus is further configured to perform at least one of:
include the matched PDRs or an indication thereof in the indication sent to the second network node; or
send the packet to the second network node.

19. The apparatus of claim 17, wherein, with respect to the modified PDR configuration, the apparatus is further configured to:
determine that no PDR conflicts exist, based on the packet matching only a single PDR in the modified PDR configuration, and, in response, applying a respective action associated with that single matched PDR; or
determine that PDR conflicts still exist, based on the packet matching more than one PDR in the modified PDR configuration, further determine that none of the multiple matched PDRs disallow PDR conflicts, and, in response, apply respective actions associated with the multiple matched PDRs.

20. The apparatus of claim 17, wherein, in response to the apparatus determining that none of the matched PDRs disallow PDR conflicts, the apparatus is configured to perform a respective action associated with each of the matched PDRs.

* * * * *